United States Patent Office 3,058,529
Patented Oct. 16, 1962

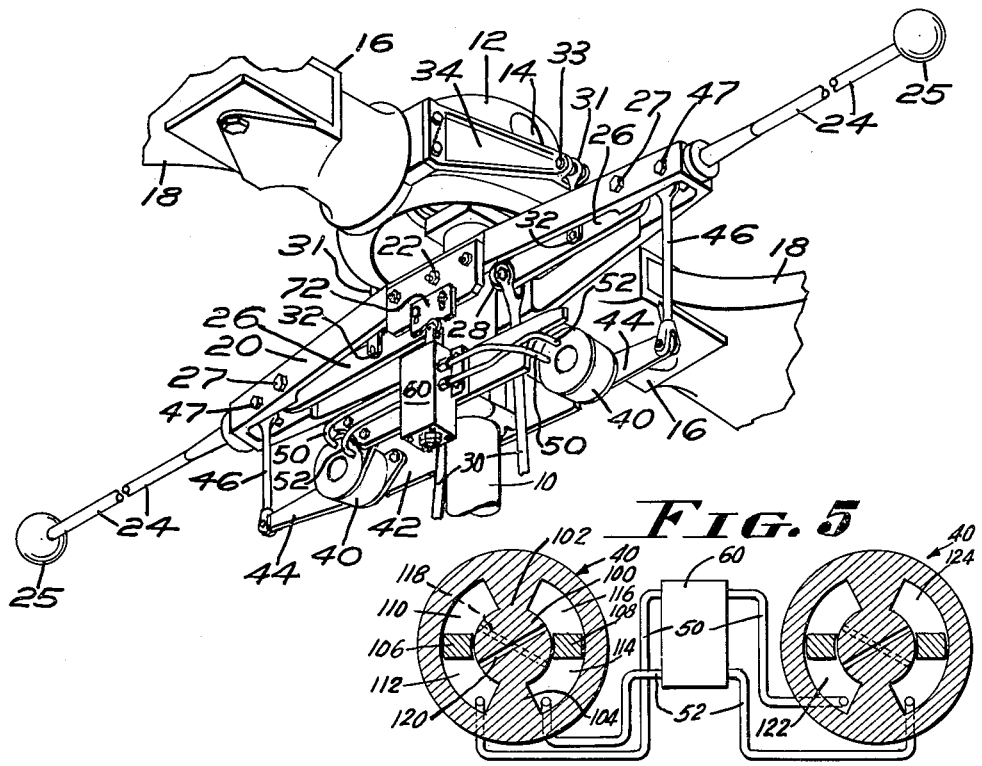

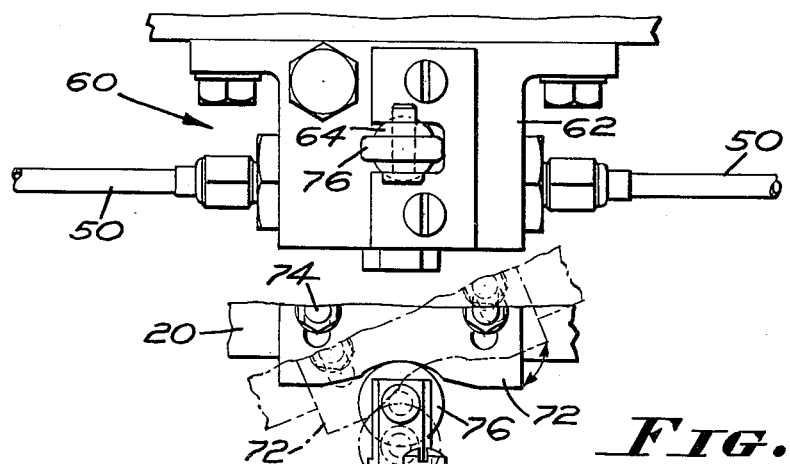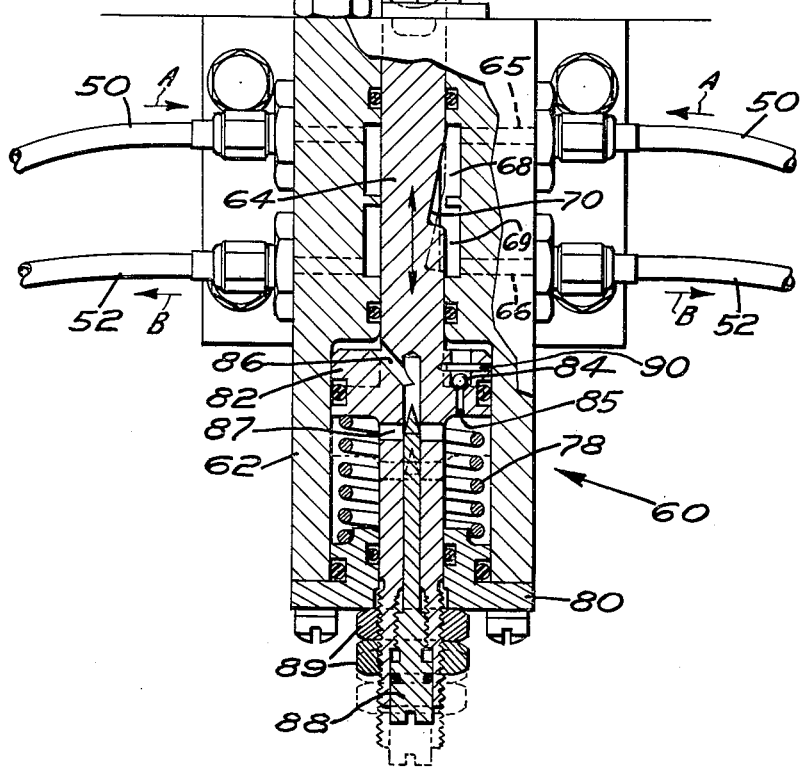

3,058,529
HELICOPTER FLIGHT CONTROL
Robert L. Pascher, Dallas, and Kenneth G. Wernicke, Hurst, Tex., assignors, by mesne assignments, to Bell Aerospace Corporation, a corporation of Delaware
Filed Sept. 30, 1958, Ser. No. 764,292
6 Claims. (Cl. 170—160.13)

This invention relates to helicopter aircraft, and more particularly to improvements in flight stabilizing means of the types disclosed for example in Patents Nos. 2,368,-698; 2,384,516 and 2,646,848. As explained in these earlier patents, inertia devices may be arranged to provide inherent stabilization of helicopter flight; the present invention relating to further refinements and improvements over the prior arrangements disclosed and described in the aforesaid patents.

It is now known that specifically in the so-called "see-saw" type rotor arrangements there are tendencies for forces imposed against the rotor to feed back through the rotor control system so as to momentarily tip the stabilizing bar, thereby combating intended pilot control effects. Hence, frictional resistance to tilting of the inertia device has been employed, so that when the helicopter is in flight at moderate forward speed the tendency of the plane of rotation of the inertia device to tilt backwardly is resisted. At such speeds of flight the velocities of the airflow in the downwash of air through the rotor varies considerably from the front half to the rear half of the rotor disc. Since the rotor is articulately connected to the mast the rotor blades operate at all times under equal lift movements, and since the downwash velocities differ as explained hereinabove the torque drag on the blade in the rear half of the disc is greater than the torque drag on the blade in the front half of the disc. This inequality in drag on the rotor blades produces a net force directed sidewise on the hub. Since the rotor blades cone upwardly above the plane of pivoting of the hub to the mast, this net sidewise force causes a couple tending to rotate the whole rotor unit about the long axis of the blades; and this couple transmits through the control linkage to the rotating inertia means a force tending to tilt the plane of rotation of the latter backwardly. (The sidewise force results in tipping the inertia device plane rearwardly because of the 90° gyroscopic lag between the azimuthal position of a force imposed against a rotating inertia device and the azimuthal position of the resulting response.)

Also, control arrangements lacking resistance to the above mentioned tendencies of the inertia device to tilt usually provide relatively slow responses to maneuvering control adjustments by the pilot. It has now been determined that the above recited undesirable effects may be better corrected by providing an improved means introducing resistance to tilting movements of the inertia means relative to the aircraft mast or frame; optimum results being obtainable in accord with the present invention by providing such resistance to tilting of the inertia means to be of variable type in conjunction with an arrangement whereby the inertia means is of such lower authority, thereby providing an inertia device "following time" which is substantially dependent on the amount of inertia device "flapping."

Therefore, it is a primary object of the present invention to provide an improved stabilizing and control system in helicopter aircraft and the like, incorporating improved stability and maneuvering control features as referred to hereinabove.

In the drawings:

FIG. 1 is a fragmentary underneath perspective view of a helicopter rotor and stabilizing bar control arrangement of the invention;

FIG. 2 is a fragmentary side elevational view thereof, illustrating diagrammatically the mode of operation thereof;

FIG. 3 is a top plan view of a damper control valve of the system;

FIG. 4 is a side elevational view of the control valve, partly broken away to show portions of the interior construction; and FIG. 5 is a view showing a form of hydraulic circuitry which may be utilized in conjunction with the present invention.

The drawing illustrates the invention in conjunction with a helicopter aircraft having a generally vertical mast 10 mounting at its upper end the aircraft rotor hub 12 by means of a pivot arrangement 14 whereby the rotor hub is pivotable on the mast about an axis extending at right angles to the long axis of the rotor. Thus, the rotor is of the "see-saw" type as referred to in the prior patents. The hub 12 is provided with diametrically opposed blade socket portions 16—16 which are rotatably mounted upon the body of the hub 12 to carry the rotor blade members 18—18 for individual blade pitch change adjustments; as for example in the manner of the blade mounting arrangements disclosed in prior Patent No. 2,384,516 and in FIG. 7 of prior Patent No. 2,368,698.

In the present drawing an inertia control means of the stabilizing bar type is employed and is illustrated to comprise a split beam 20 which is pivoted to the mast 10 by means of a pivot connection at 22 so as to be rockable relative to the mast about an axis extending parallel to the long axis of the rotor unit and at right angles to the axis of the rotor pivot device 14. Arms 24—24 extend from opposite ends of the beam 20 and carry weights 25—25 to provide the required masses at the ends of the stabilizer bar, as has been previously explained in the earlier patents. Pilot-operable control means are supplied in association with the stabilizing bar unit whereby the aircraft pilot may be given full maneuvering control of the aircraft as explained in the earlier patents referred to; and for this purpose in the case of the present specification the drawing is illustrated to include within each of the opposite ends of the beam 20 a rocker arm 26 which is pivotally connected at one end by means of a pin 27 to the beam 20 and at its other end by means of a pin 28 to the upper end of a corresponding pilot-operable push-pull strut 30. Rotor blade pitch control links 31—31 are connected at their lower ends to the rocker arms 26—26 as by means of pins 32—32, and at their upper ends by means of pins 33—33 to horns 34—34 which extend from the blade root portions 16 at opposite sides of the hub 12.

Thus, whenever the mast 10 is tipped relative to the stabilizer bar unit, one of the rotor blades will be rotated through action of the stabilizer bar linkages into a position of increased pitch angle, while the other blade is simultaneously rotated through action of the stabilizer bar linkage connections into a position of decreased angle of pitch, as explained in detail in the earlier patents referred to hereinabove, and as illustrated in FIG. 2 of the drawing herein. To provide for pilot control of the rotor the struts 30—30 may be pivotally connected at their lower ends to any suitable control means such as for example the outer race of a Saturn ring (not shown) mounted to be universally rockable relative to the aircraft mast and freely rotatable relative thereto about the axis of the mast; such as is disclosed in Patent 2,368,698. Consequently, it will be understood that as the mast rotates in response to driving action of the aircraft engine, the fly bar and rotor and control linkage mechanism will rotate therewith, while the pilot control means may be arranged to extend from the inner race of the Saturn ring into convenient reach of the aircraft pilot.

Thus operation of the rotor control may be explained for example, as whenever the mast undergoes an inclination relative to the normal vertical attitude thereof, the fly bar nevertheless tends to preserve its initial horizontal plane of rotation due to its inertia in rotation. Since the Saturn ring is rigidly connected to the pilot control handle and is thereby substantially fixed in position relative to the mast, it will partake of the inclination of the mast relative to the horizon. Such positional change of the Saturn ring relative to the plane of rotation of the fly bar will cause the rockers 26—26 to oscillate about the fulcrums 27—27 which are substantially vertically stationary due to the inertia of the fly bar against shifting out of its initially horizontal plane of rotation. Consequently, the rockers 26 will act to cause the rotor blades to pivot about their longitudinal pitch change axes, thereby "feathering" the rotor so as to cause it to tend to track in a plane inclined with respect to the mast in such direction that the lift vector is so directed as to tend to restore the mast to a vertical attitude. Thus, stabilizing influences are automatically generated in response to every upsetting tendency and without attention to the control system by the pilot. If, however, the pilot manipulates his control handle so as to tilt the Saturn ring relative to the mast the connected linkage operates to cause the plane of the rotor to be tilted independently of any concurrently acting stabilizing effects as explained hereinabove, whereby a thrust force tending to drive the aircraft horizontally in the desired direction will be developed.

As explained hereinabove, in order to obtain optimum hovering stability and sensitiveness of maneuvering control, a resistance to pivotal movements of the stabilizing bar relative to the mast must be employed such as a pair of hydrodynamic damping units as indicated at 40—40 in the drawing herewith, although it is to be understood that the damping units may be of any other type in lieu of the style which is specifically indicated in the drawing. Several types of hydraulic damping devices suitable for the purpose are currently manufactured such as for example the type disclosed in detail in U.S. Patent No. 2,173,372.

Thus, as illustrated in the drawing, the damping means may comprise for example a pair of variable dampers designated 40—40 which are shown mounted at opposite sides of the mast 10 by means of a bracket 42; the actuating arms 44—44 of the damping devices being pivotally connected to struts 46—46 which in turn extend into pivotal connections with the stabilizer bar 20, as by being coupled thereto by pivot pins 47—47. Hence, any pivoting of the stabilizer bar 20 relative to the mast 10 will be accompanied by corresponding motions of the crank arms 44—44 relative to the damping unit casings. If the forces tending to pivot the bar relative to the mast are relatively slight, the units 40—40 will generate only slight resistances or damping effects; while if the forces operating against the stabilizing bar tend to pivot it relatively violently, the units 40—40 operate instantaneously to counter such tendencies with maximum resistance effects.

In the Patent 2,173,372 hereinabove referred to the flow of fluid incidental to movement of the piston is regulated by means of a pre-set valve installed interiorly of the mechanism for control of the rate of piston motion. However, in the case of the present invention the dual dampers 40—40 are hydraulically interconnected and controlled by a common valve device which is variably adjusted incidental to operation of the helicopter; the purpose being to provide a variable stabilizing bar damping action. Thus, as shown in FIGS. 1, 2, the damper casings at opposite sides of the pistons are formed with ports reversely interconnected by conduits 50, 52 whereby see-saw motions of the stabilizer bar 20 induce corresponding reciprocal flows of hydraulic fluid through the conduits 50, 52. Metering of the rate of fluid flow, and consequent control of the rate of damping of the stabilizer bar motion is obtained by interposition in the lines of the conduits 50, 52 of a specially controlled valve indicated generally at 60. That is to say, referring to FIG. 4, upon movement of the stabilizing bar in one direction, fluid will flow from the dampers 40—40 in the direction of the arrows A into the chamber 68 and at the same time, fluid will flow outwardly from the chamber 69 in the direction of the arrows B in FIG 4. Upon opposite movement of the stabilizing bar the fluid flow as described above will be reversed.

One form of hydraulic circuitry which may be used in association with the units 40 and the control valve 60 will be seen from a study of FIG. 5. In this figure the units 40 are somewhat diagrammatically shown and are representative of the type of units disclosed in Patent 2,173,372. In FIG 5, it will be appreciated that the body of each unit 40 is provided therewithin with a cylindrical boss member 100 having diametrically opposed fixed abutment members 102 and 104 and that the interior of the element 40 in each case is provided with a rotatable piston having diametrically opposed oscillatable portions 106 and 108 which cooperate with the fixed abutment members 102 and 104 to divide the interior of the member 40 into four chambers 110, 112, 114 and 116. These pistons are connected to the arms 44 (see FIG 1) as for example by mounting each arm 44 rigidly upon the shaft 17 as shown in FIG. 2 of the aforesaid patent. Each diametrically opposed pair of such chambers are interconnected by passageways in the boss 100. Thus, the two chambers 110 and 114 are interconnected by the passage 118 and the two chambers 112 and 116 are interconnected by the passage 120, it being understood that the valve 31 of the patent structure is manipulated to close off communication between passages 118 and 120. Thus, upon counterclockwise rotation of the piston member, more especially the portions 106 and 108 thereof, the two chambers 112 and 116 decrease in volume and the two chambers 110 and 114 increase in volume. The end walls of the members 40 are provided with tapped openings by means of which the conduits 50 and 52 are connected to corresponding pairs of chambers 110 and 114 or 112 and 116. Thus, upon the aforesaid counterclockwise rotation of the piston elements 106 and 108, hydraulic fluid contained in each unit 40 will be acted upon by the piston portions to flow within the conduits 50 and 52 connected to the control valve member 60. It will be also noted from FIG. 5, that the conduit 50 in association with the left hand unit 40 is connected to those chambers, 112 and 116, which decrease in volume when the rotation of the piston elements 106 and 108 is counterclockwise, the conduit 50 connected to the other or right hand unit 40 is connected to the chambers 122 and 124 of the unit 40 on the right hand side which would also be decreasing in volume upon rotation of the piston elements 126 and 128 thereof in the counterclockwise direction. This would impose a flow of hydraulic fluid in each case through the two conduits 50 to flow to the control valve 60 and from there to the return conduits 52 which are extended to those chambers which are of increasing volume in each case. Thus, in any instance of rotation of the members 40 or more especially their pistons associated therewith, flow of hydraulic fluid will be caused either through the conduits 50 to the valve 60 and returning through the conduits 52 or vice versa.

As shown in detail in FIGS. 3, 4, the valve 60 includes a casing 62 which is vertically bored to slidably accommodate a valve stem 64. The casing 62 is formed with passageways 65, 66 leading from the port connections of the conduits 50, 52; the passageways 65, 66 in turn communicating with enlarged chambers 68, 69 surrounding the valve stem 64. Thus, the hydraulic fluid may at all times pass around the valve stem between opposite ends of the conduits. However, variably throttled control of the fluid flow is obtained by provision of a chamfer cut at one side of the valve stem as indicated at 70 (FIG. 4) whereby longitudinal displacements of the valve stem 64 will variably throtle passage of fluid from chambers 68, 69 and hence the flow of fluid through the conduits 50, 52.

Displacements of the stem 64 are procured automatically as functions of the angular position of the bar 20 relative to the mast 10 through provision of an arcuately shaped cam plate 72 which is centrally bolted to the stabilizer bar as indicated at 74. The cam surface of the plate 72 rides upon a roller 76 carried at the upper end of the valve stem 64. At the lower end of the valve casing it encloses a compression spring 78 which is supported by a closure gland 80 and bears at its other end against an enlarged shoulder portion 82 of the valve stem.

It is a particular feature of the present invention that down motions of the stem 64 and return motions upwardly thereof are variably controlled. For example, a ball check as shown at 84 is provided to open on the down stroke to permit flow of fluid through a port 85 in the piston portion 82 of the stem 64. A variable return orifice 86 is also provided in the piston in communication with a lateral port 87 and is controlled by a manually settable needle valve 88. Lock nuts 89 provide means for limiting the upward motion of the stem 64. A pin 90 cages the ball 84 in operative position.

The needle valve 88 is set in a position of adjustment such as will provide a dash pot action controlling the flow of hydraulic fluid from port 87 through port 86, so that the stem 64 will remain in depressed position substantially as results from each operation of the cam plate upon the roller 76, for a predetermined portion of the rotor revolution. For example, in the aircraft configuration shown the needle will be set to prevent total return of stem 64 for the duration of one quarter rotor revolution thereafter.

Hence, the rate of orifice opening, as controlled by the dash pot, provides a variable coefficient of stabilizer bar pivoting including minimum damping restraint of the bar motion initially away from normal perpendicularity for maximum inherent stability results, while also providing increased damping effects in the region of extreme precessions of the bar, to prevent hitting the bar limit stops. Thus, by virtue of the present invention an improved "following time" rate control for the stabilizer bar is provided whereby it is feasible to employ a lower stability ratio to provide much improved stability characteristics under normal conditions, without reduction of maneuverability control characteristics or loss of mechanical stop safety factors.

It is to be understood of course that in lieu of the specific type of stabilizing bar motion resistance device illustrated and described in detail hereinabove, other means might be used such as friction surfaces; dash-pot means; variable leverage mechanisms, and the like, to obtain the features and advantages of the present invention. Therefore, it will be apparent to those skilled in the art that the invention is not so limited but that various changes may be made therein without departing from the spirit of the invention or the scope of the appended claims.

We claim:

1. In an aircraft, a lift rotor including a positionally fixed but rotatable drive shaft and blade means, means mounting said blade means on said drive shaft for change of the effective incidence of said blade means, inertia means carried by said shaft to be pivotable thereon for universal inclinations relative to the aircraft, means connecting said inertia means with said blade means to control the effective incidence of said blade means, a pilot operable control means interconnecting said blade means and said inertia means and adjustable to vary the relative inclination of the planes of rotation of said rotor blade means and said inertia means, and damping means interconnecting said inertia means and said shaft and arranged to variably damp inclination movements of said inertia means relative to said shaft said damping means comprising a member having a fluid passageway therethrough and a throttling device therefor coupled to said inertia means and thereby variably throttling flow of fluid through said damping means in accordance with the operative position of said inertia means.

2. In an aircraft, a rotary member mounted for rotation about a generally upright axis, blade means, means mounting said blade means on said rotary member for change of the effective incidence of said blade means, inertia means rotatable about a generally upright axis, means mounting said inertia means on said rotary member for inclination relative thereto, means connecting said inertia means with said blade means to control the effective incidence of said blade means, a pilot operable control means interconnecting said blade means and said inertia means and adjustable to vary the relative inclination of the planes of rotation of said rotor and said inertia means, and damping means interconnecting said inertia means and said rotary member and arranged to damp inclination movements of said inertia means relative to said aircraft said damping means comprising a member having a fluid passageway therethrough and a throttling device therefor coupled to said inertia means and thereby variably throttling flow of fluid through said damping means in accordance with the operative position of said inertia means.

3. In an aircraft, an upright rotary member positionally fixed in said aircraft, blade means, means mounting said blade means on said rotary member for change of the effective incidence of said blade means, inertia means carried by said rotary member to be pivotable thereon about a longitudinal axis generally parallel to the change of incidence axis of said blade means whereby said inertia means is mounted upon the aircraft for universal inclinations, means connecting said inertia means with said blade means to control the effective incidence of said blade means, a pilot operable control means interconnecting said blade means and said inertia means and adjustable to vary the relative inclination of the planes of rotation of said rotor and said inertia means, and damping means interconnecting said inertia means and said rotary member and arranged to damp inclination movements of said inertia means relative to said member said damping means comprising a member having a fluid passageway therethrough and a throttling device therefor coupled to said inertia means and thereby variably throttling flow of fluid through said damping means in accordance with the operative position of said inertia means.

4. In an aircraft, a rotary member mounted in positionally fixed relation for rotation about a generally upright axis, blade means, means mounting said blade means on said rotary member for change of the effective incidence of said blade means, inertia means rotatable about a generally upright axis, means mounting said inertia means on said rotary member for inclination relative thereto, means connecting said inertia means with said blade means to control the effective incidence of said blade means, a pilot operable control means interconnecting said blade means and said inertia means and adjustable to vary the relative inclination of the planes of rotation of said rotor and said inertia means, and damping means interconnecting said inertia means and said rotary member and arranged to damp inclination movements of said inertia means relative to said aircraft, said damping means including a variable orifice and throttling means therefor operable in response to changes in position of said inertia means to move at different rates of motion according to the position of said inertia means during inertia means initial and return motions.

5. In an aircraft, a rotary member mounted for rotation about a generally upright axis, blade means, means mounting said blade means on said rotary member for change of the effective incidence of said blade means, inertia means rotatable about a generally upright axis, means mounting said inertia means on said rotary member for inclination relative thereto, means connecting said inertia means with said blade means to control the effective incidence of said blade means, and damping means interconnecting said inertia means and said rotary member and arranged to damp inclination movements of said inertia means relative to said aircraft said damping means comprising a member having a fluid passageway therethrough and a throttling device therefor coupled to said inertia means and thereby variably throttling flow of fluid through said damping means in accordance with the operative position of said inertia means.

6. In an aircraft, a rotary member, blade means, means mounting said blade means on said rotary member for change of the effective incidence of the blade means, inertia means carried by said rotary member and pivotable thereon, means connecting said inertia means with the blade means to control the effective incidence of said blade means, and damping means interconnecting said inertia means and said rotary member and arranged to damp pivotal movements of said inertia means relative to said rotary member, said damping means comprising mechanism connected to said inertia means to retard movements thereof, and means connected to and responsive to the position of said inertia means to non-linearly vary the motion retarding effect of said mechanism.

References Cited in the file of this patent

UNITED STATES PATENTS 2,646,848     Young _____ July 28, 1953

FOREIGN PATENTS 675,657     Great Britain _____ July 16, 1952